US012380480B2

(12) United States Patent
de Juan et al.

(10) Patent No.: US 12,380,480 B2
(45) Date of Patent: Aug. 5, 2025

(54) METHOD, NON-TRANSITORY MACHINE READABLE MEDIUM, AND COMPUTING DEVICE FOR PRODUCT SIMILARITY DETECTION AND RECOMMENDATION

(71) Applicant: Yahoo Ad Tech LLC, Wilmington, DE (US)

(72) Inventors: Paloma de Juan, New York, NY (US); Ritesh Kumar Shyam Sunder Agrawal, Santa Clara, CA (US); Sricharanya Venkataramani, Fremont, CA (US); Eric McVoy Dodds, Berkeley, CA (US); Gaurav Batra, Cupertino, CA (US); Simao Herdade, San Francisco, CA (US)

(73) Assignee: Yahoo Ad Tech LLC, New York, NY (US)

( * ) Notice: Subject to any disclaimer, the term of this patent is extended or adjusted under 35 U.S.C. 154(b) by 376 days.

(21) Appl. No.: 17/670,682

(22) Filed: Feb. 14, 2022

(65) Prior Publication Data
US 2023/0260001 A1     Aug. 17, 2023

(51) Int. Cl.
*G06Q 30/0601*     (2023.01)
(52) U.S. Cl.
CPC ..... *G06Q 30/0627* (2013.01); *G06Q 30/0631* (2013.01)
(58) Field of Classification Search
CPC . G06Q 30/0631; G06Q 30/0623–0629; G06Q 30/0643
See application file for complete search history.

(56) References Cited

U.S. PATENT DOCUMENTS 9,984,402 B2 *   5/2018   Cao ........................... G06T 7/66
10,949,907 B1 *  3/2021   Jain .......................... G06N 3/08
(Continued)

OTHER PUBLICATIONS

McAuley, J., et al. "Image-Based Recommendations on Styles and Substitutes." In Proceedings of the 38th International ACM SIGIR Conference on Research and Development in Information Retrieval (SIGIR '15). Association for Computing Machinery, New York, NY, USA, 43-52. (Year: 2015).*
Rahdari, B., et al. "Controlling Personalized Recommendations in Two Dimensions with a Carousel-Based Interface." IntRS'21: Joint Workshop on Interfaces and Human Decision Making for Recommender Systems. Virtual. (Year: 2021).*
(Continued)

*Primary Examiner* — Jeffrey A. Smith
*Assistant Examiner* — Katherine A Barlow
(74) *Attorney, Agent, or Firm* — Cooper Legal Group LLC (57) ABSTRACT

One or more systems and/or methods for product similarity detection and recommendation are provided. Users may view articles and/or other content that includes images depicting products that may be of interest to the users. These images are processed using image processing functionality such as computer vision to identify the products depicted by the images. A vector embedding model is used to generate product vector representations of the products. Catalog items that are available from a catalog to supplement the articles and other content may be processed to generate catalog item vector representations. When content (an article) with an image depicting a product is to be displayed to the user, similarity between a product vector representation of the product and the catalog item vector representations is determined in order to identify and display catalog items depicting products that are similar to the product depicted by the image in the content.

20 Claims, 8 Drawing Sheets

(56) References Cited

U.S. PATENT DOCUMENTS

| | | | | |
|---|---|---|---|---|
| 11,055,344 | B2* | 7/2021 | Chaudhuri | G06Q 30/0643 |
| 2011/0010307 | A1* | 1/2011 | Bates | G06Q 30/02 |
| | | | | 705/26.7 |
| 2017/0163882 | A1* | 6/2017 | Piramuthu | H04N 23/90 |
| 2019/0130285 | A1* | 5/2019 | Snyder | G06Q 30/0641 |
| 2019/0287154 | A1* | 9/2019 | Kakinuma | G06Q 30/0631 |
| 2020/0034782 | A1* | 1/2020 | Hsieh | G06Q 30/0627 |
| 2020/0134694 | A1* | 4/2020 | Park | G06Q 30/0631 |
| 2020/0311798 | A1* | 10/2020 | Forsyth | G06Q 30/0631 |
| 2020/0372560 | A1* | 11/2020 | Dahl | G06F 16/5866 |
| 2021/0048931 | A1* | 2/2021 | Barzelay | G06Q 30/0601 |
| 2021/0241344 | A1* | 8/2021 | Mantha | G06F 16/9035 |
| 2021/0312678 | A1* | 10/2021 | Luo | H04L 51/216 |
| 2023/0222147 | A1* | 7/2023 | Nguyen | G06N 20/00 |
| | | | | 707/747 |
| 2023/0245208 | A1* | 8/2023 | Zhang | G06T 7/90 |

OTHER PUBLICATIONS

He, X., et. al. "NAIS: Neural Attentive Item Similarity Model for Recommendation," in IEEE Transactions on Knowledge and Data Engineering, vol. 30, No. 12, pp. 2354-2366, doi: 10.1109/TKDE.2018.2831682. (Year: 2018).*

Kiapour, M. H., et. al. "Where to Buy It: Matching Street Clothing Photos in Online Shops" Proceedings of the IEEE International Conference on Computer Vision (ICCV), pp. 3343-3351. (Year: 2015).*

Zheng et. al. "ModaNet: A Large-scale Street Fashion Dataset with Polygon Annotations." In Proceedings of the 26th ACM international conference on Multimedia (MM '18). Association for Computing Machinery, New York, NY, USA, 1670-1678. (Year: 2018).*

Carniero, G., et. al., "Supervised Learning of Semantic Classes for Image Annotation and Retrieval," in IEEE Transactions on Pattern Analysis and Machine Intelligence, vol. 29, No. 3, pp. 394-410, doi: 10.1109/TPAMI.2007.61. (Year: 2007).*

* cited by examiner

METHOD, NON-TRANSITORY MACHINE READABLE MEDIUM, AND COMPUTING DEVICE FOR PRODUCT SIMILARITY DETECTION AND RECOMMENDATION

BACKGROUND

Many users of computing devices access and view highly visual content that includes images and photos. For example, a news platform may provide computing devices with access to articles and/or other content that includes images and photos related to the articles and content. These articles and/or other content may be display through a website, an application, or other user interface. These images may depict various types of products that may be of interest to a user accessing the content. Unfortunately, the user may be unable to identify a particular product and/or may not be able to readily access additional information about that product. Thus, the user experience is less immersive and informative due to the lack to additional information about the products that would otherwise be helpful and interesting to the user.

SUMMARY

In accordance with the present disclosure, one or more computing devices and/or methods for product similarity detection and recommendation are provided. A catalog of catalog items may be available to display through user interfaces on computing devices, such as through a website, an application, etc. The catalog items may depict products, such as where the catalog items illustrate and describe clothing, jewelry, cars, furniture, shoes, equipment, and/or a wide variety of products. Certain users may have an interest in the products depicted by these catalog items. Accordingly, products that may be of interest to a user may be identified based upon the products being similar or complimentary to products depicted by images within content (e.g., an article, a webpage, etc.) that the user is accessing. For example, if a user is viewing an article about a celebrity shopping for clothing, then a shirt that the celebrity is wearing in an image within the article may be of interest to the user.

As provided herein, products that are similar and/or complimentary to products depicted within images of content (an article) being accessed by a user through a computing device may be identified and displayed through the computing device to supplement the content. In particular, image processing functionality, such as computer vision functionality, an object detector, and/or a vector embedding module may be used to identify products depicted by images, such as images within articles and/or other content that may be accessed by the user through the computing device. The image processing functionality may be used to generate product embeddings for the products depicted by the images, which may include product vector representations created by projecting attributes of the products into vector space. When the user requests access to content (an article) comprising one or more of these images, products depicted within the images may be detected and the product vector representations may be used to identify similar and/or complimentary to products to recommend to the user.

In some embodiments of identifying similar and/or complimentary products to recommend to the user, the image processing functionality may be used to process products depicted by catalog items within a catalog of catalog items available for supplementing the content (the article) being accessed by the user. The image processing functionality may be used to generate catalog item vector representations of the products. In order to determine which of these products depicted by the catalog items may be similar and/or complimentary to the detected products in the images of the content (the article), a similarity between the product vector representations of the detected products and the catalog item vector representations may be computed to generate a ranked list of catalog items of the catalog items in the catalog. The products of the catalog items in the catalog are ranked based upon how similar the products depicted by the catalog items are to the detected products within the images of the content (the article) being accessed by the user. In this way, one or more of the products may be selected from the ranked list of catalog items (e.g., one or more highest ranked products) and so that catalog items depicting the selected products are displayed along with the content to the user through the computing device. For example, if detected image of an article depicts a woman wearing a scarf, then catalog items depicting similar scarfs (e.g., similar in style, color, size, material, or other attributes) and/or complimentary items (e.g., a belt that is similar in color, style, material, or other attributes of the scarf) may be identified and displayed to the user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
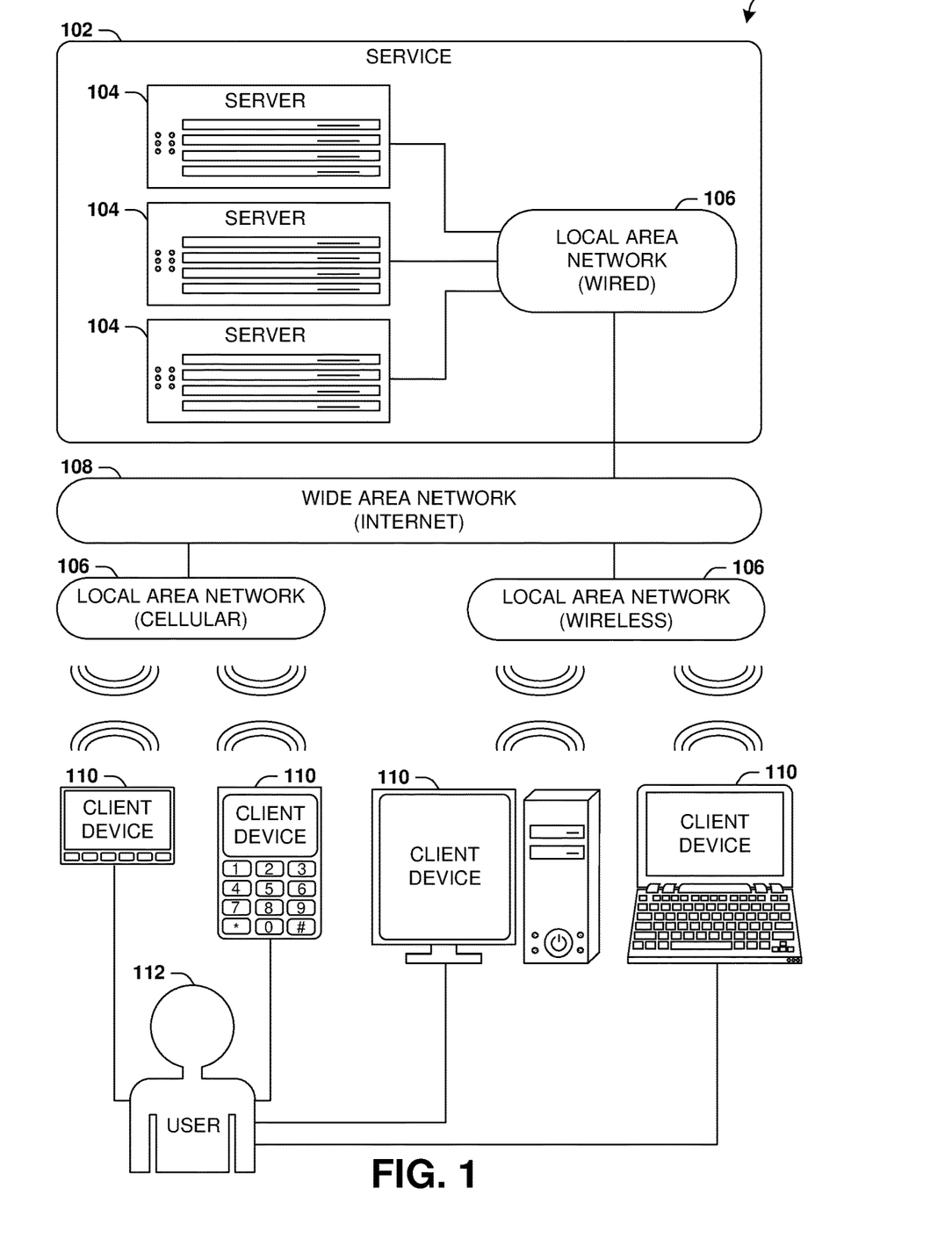
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
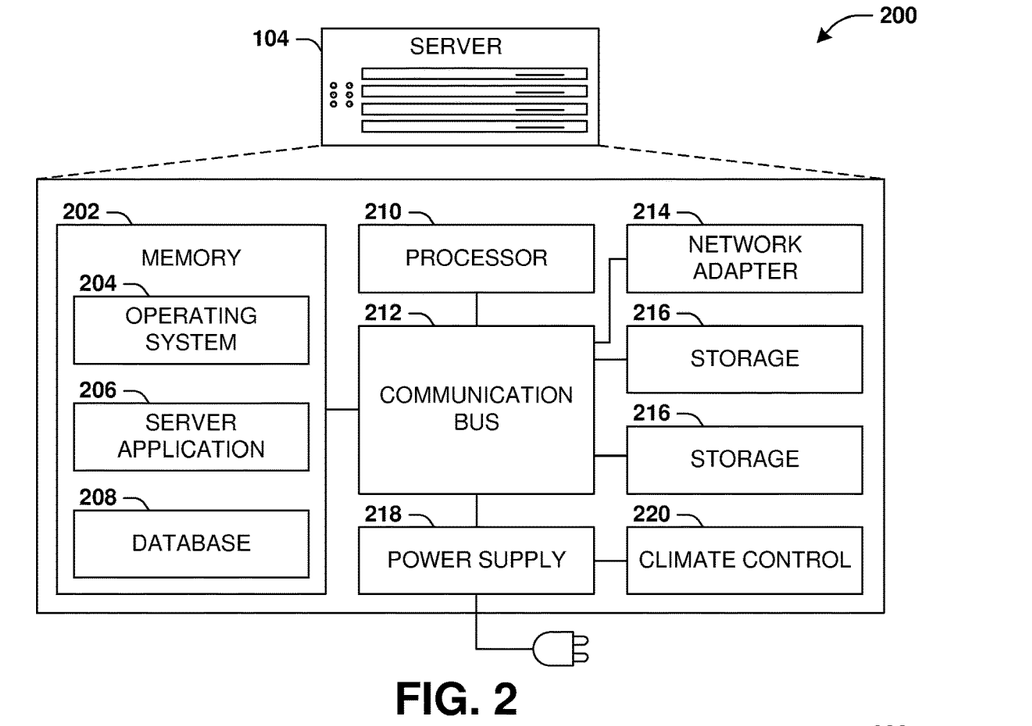
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
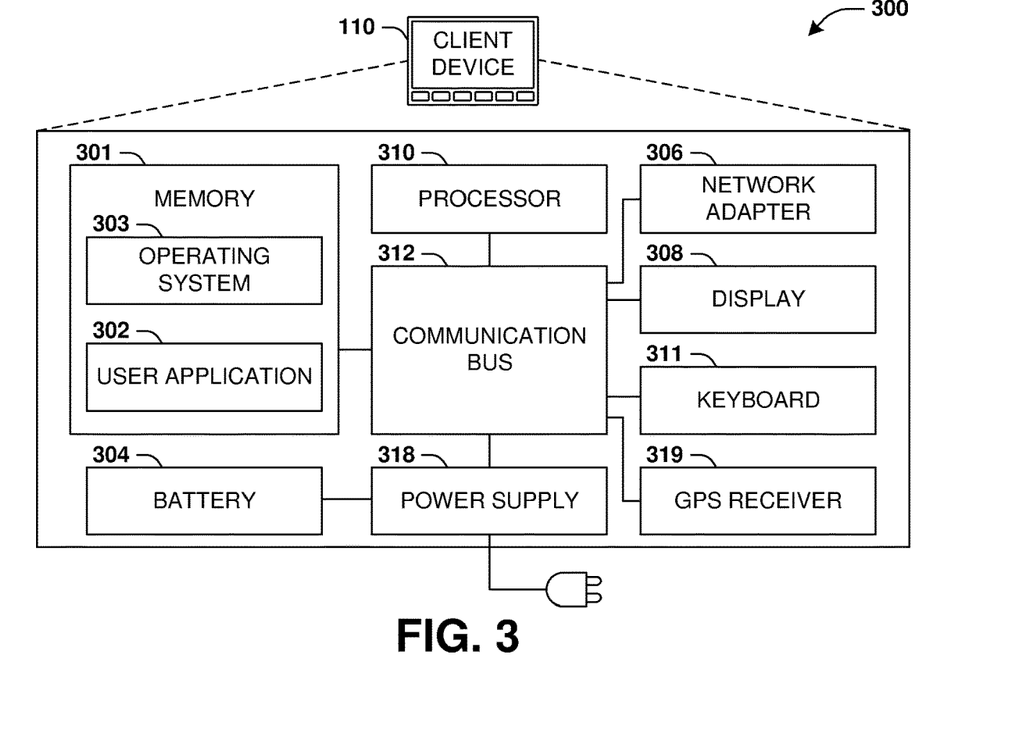
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for product similarity detection and recommendation are provided. Every day, millions of users consume highly visual content, such as articles with photos, images, and videos related to the content of the articles. These users may consume such content through various types of computing devices, such as mobile devices, tablets, laptops, videogame systems, smart devices, wearable devices, etc. The content may be access through websites, applications, or other types of user interfaces. The user's experience may be improved by recommending additional catalog items, such as products, that may be relevant and interesting to the user. Recommending products that may be similar or complimentary to products depicted in images of the content being access by the user will improve user engagement, provide a seamless and immersive experience, and provide the user with the ability to discover and explore new products that may match their persona and/or interests while keeping the user highly entertained and engaged.

Identifying products depicted in images of content (e.g., images in an entertainment news article about a celebrity) being accessed by a user as detected products, and identifying and selecting catalog items of products that are similar or complimentary to the detected products is complex and non-trivial. In order to achieve this, computer vision functionality, such as a computer vision model of neural network layers, is custom trained and configured to identify products, utilize a vector embedding model to project attributes of the detected products into vector space to create embeddings of vector representations, execute similarity detection functionality to determine similarity between the vector representations, rank products based upon similarity, and selectively provide certain catalog items of similar or complimentary products to the user. In this way, product similarity detection and recommendation of similar or complimentary products may be provided by this customized computer vision functionality.

Figure 4:
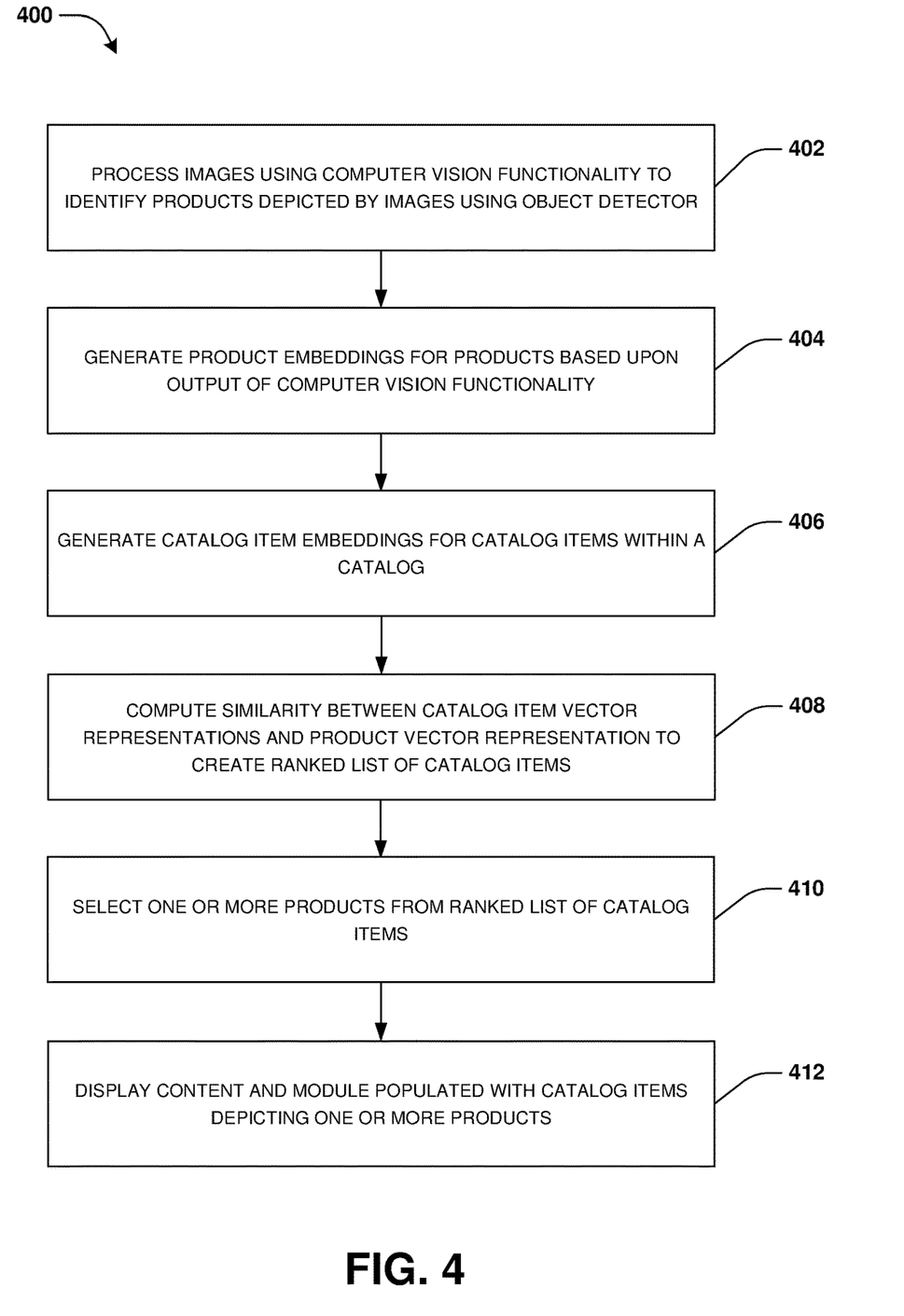
FIG. 4 is a flow chart illustrating an example method for product similarity detection and recommendation.
Figure 5A:
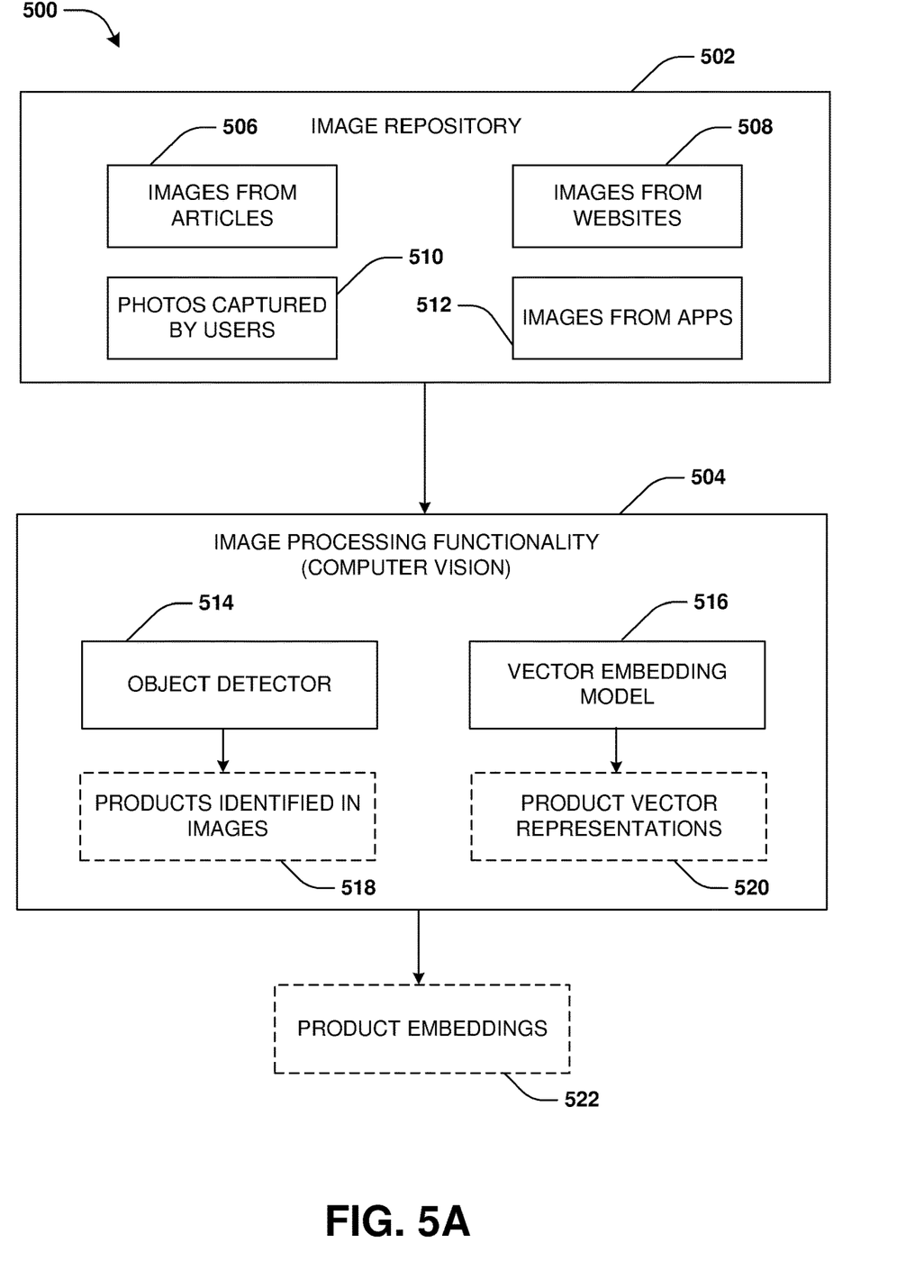
FIG. 5A is a component block diagram illustrating an example system for product similarity detection and recommendation, where product vector representations are generated.
Figure 5B:
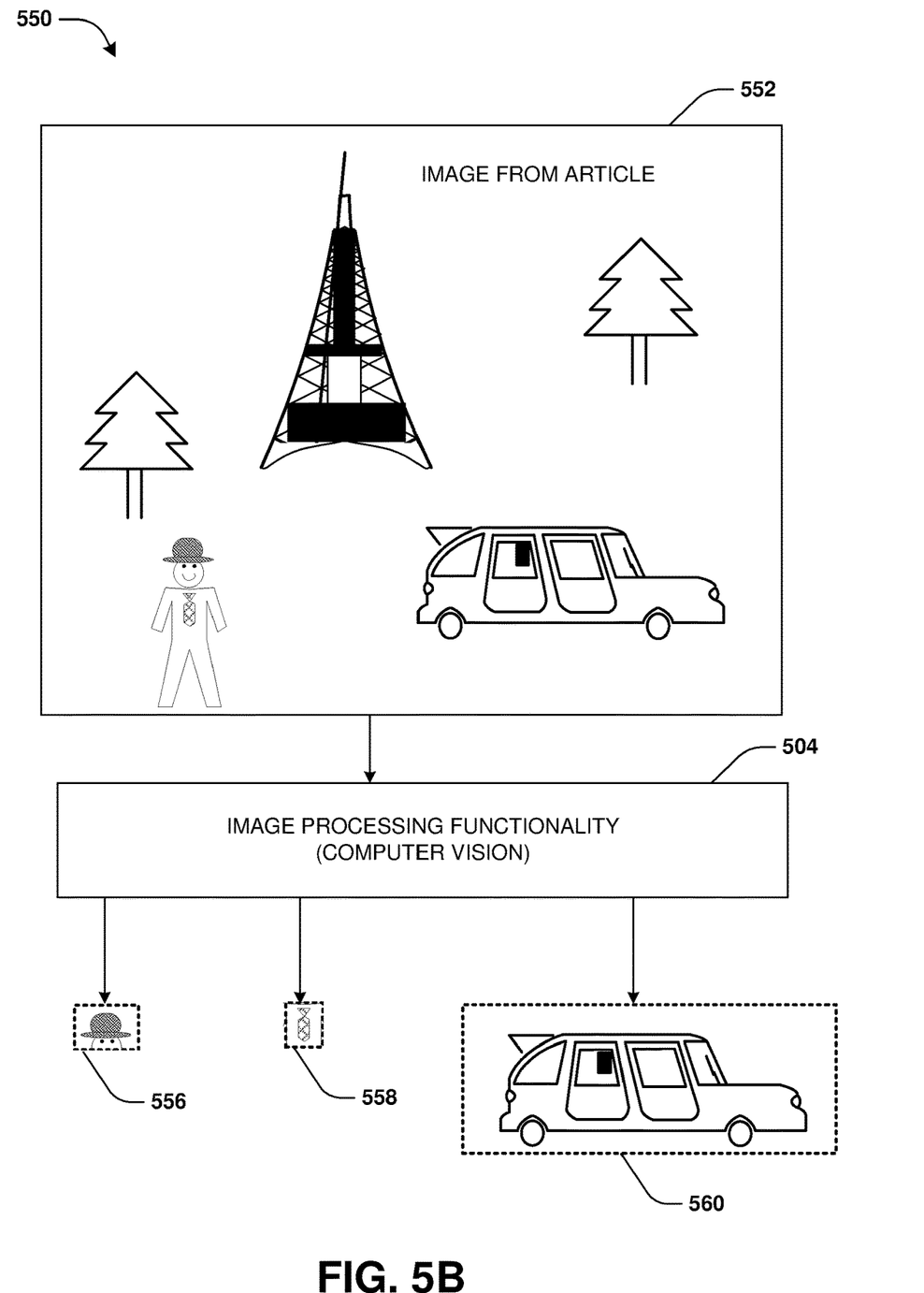
FIG. 5B is a component block diagram illustrating an example system for product similarity detection and recommendation, where bounding boxes are generated.
Figure 6:
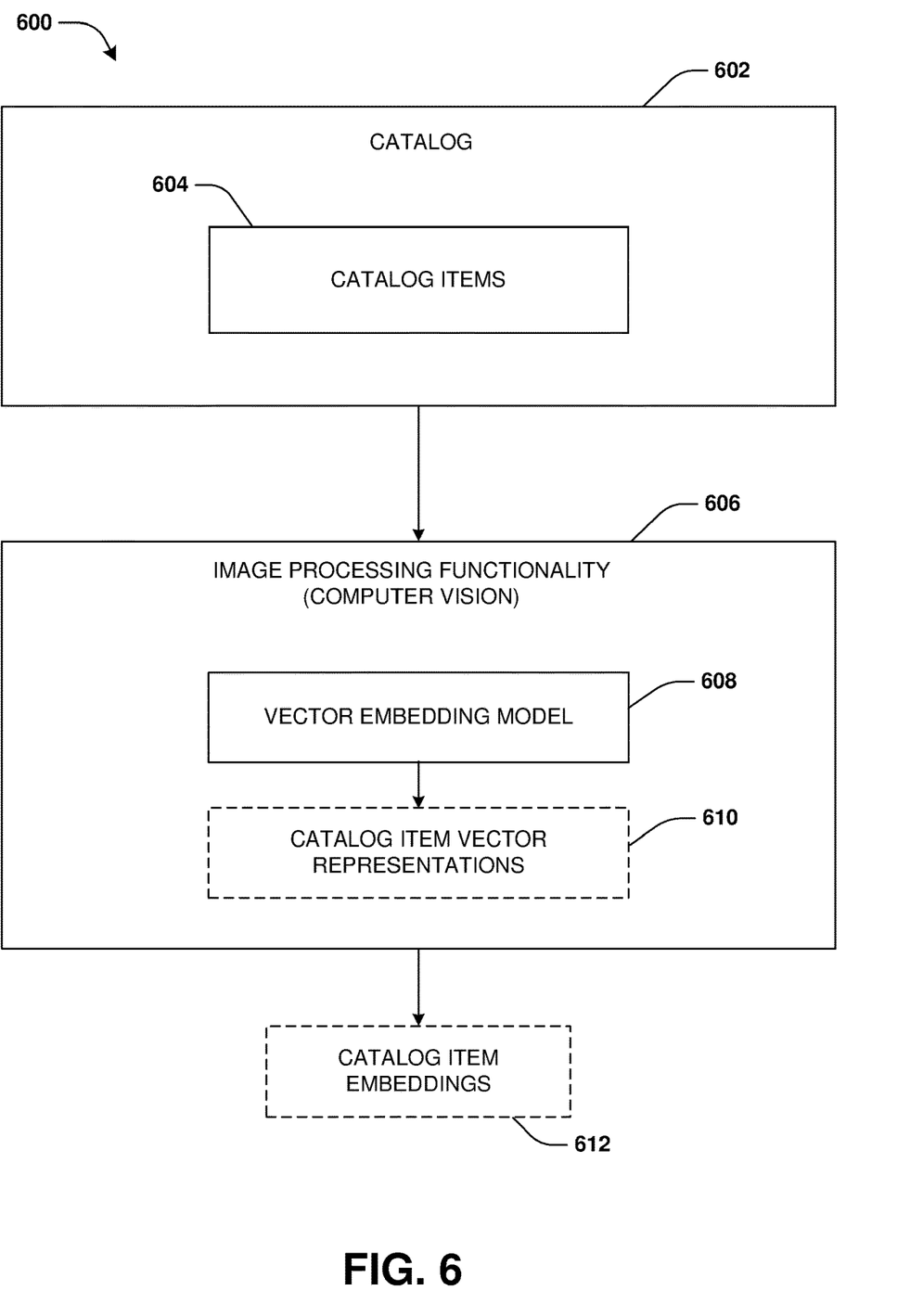
FIG. 6 is a component block diagram illustrating an example system for product similarity detection and recommendation, where catalog item vector representations are generated.
Figure 7:
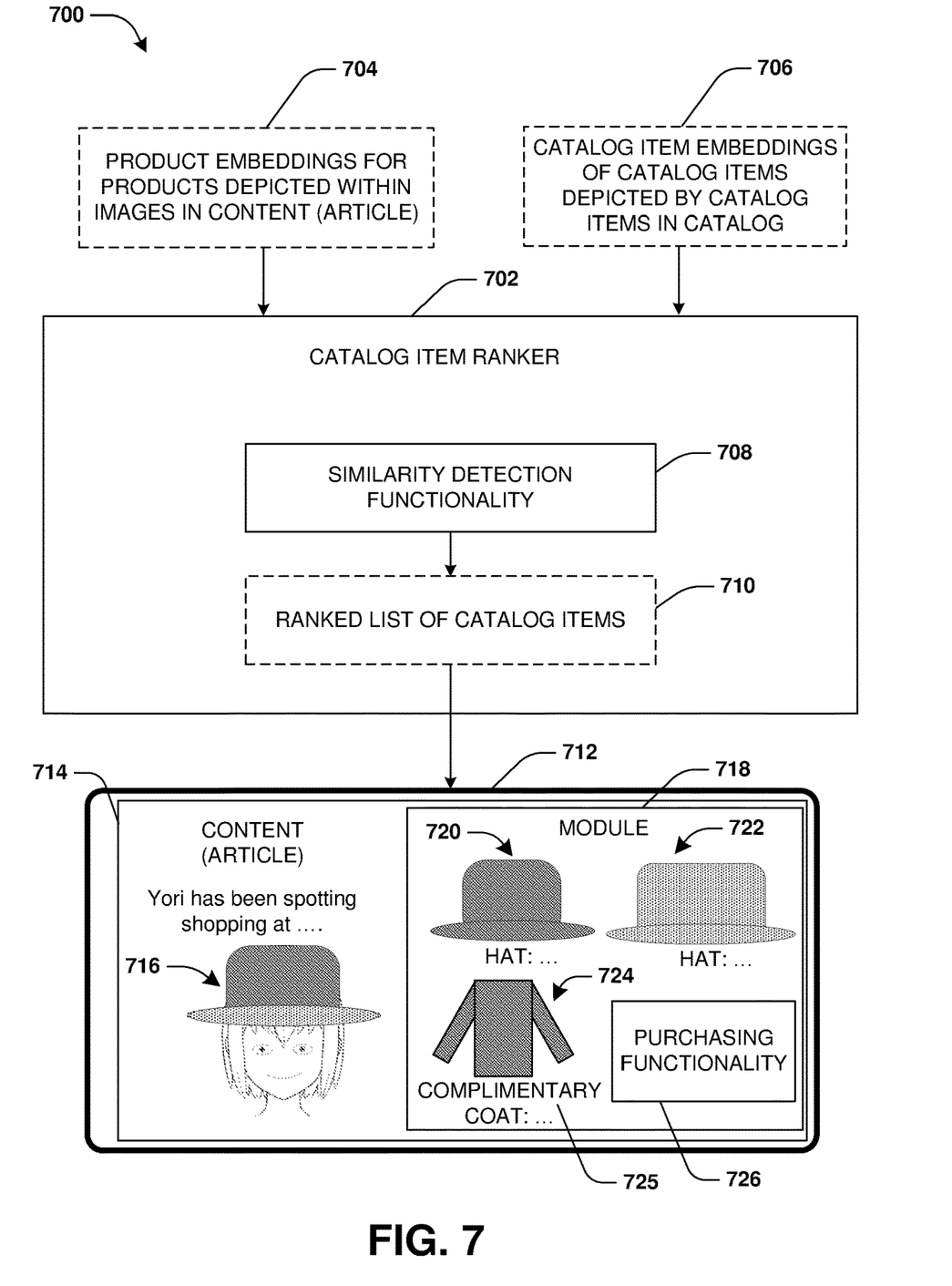
FIG. 7 is a component block diagram illustrating an example system for product similarity detection and recommendation, where catalog items depicting products selected from a ranked list of catalog items are displayed through a user interface of a device.

One embodiment of product similarity detection and recommendation is illustrated by an exemplary method 400 of FIG. 4 and is further described in conjunction with system 500 of FIG. 5A, system 550 of FIG. 5B, system 600 of FIG. 6, and system 700 of FIG. 7. An image repository 502 may comprise images that have been extracted from content and/or obtained from various sources, as illustrated by FIG. 5A. In some embodiments, the image repository 502 may comprise images 506 extracted from articles that are available for access through computing devices of users from a news distribution service. For example, a mobile device of a user may be used to access and display a sports article populated with images of a sporting event discussed by the sports article.

In some embodiments, the image repository 502 may comprise images 508 extracted from websites that may be access through the computing devices of the user from a website provider. For example, a browser of a tablet device of the user may be used to access and display a videogame website populated with images of gamers playing videogames at a gaming convention. In some embodiments, the image repository 502 may comprise photos 510 captured by users. For example, a user may capture a photo of a boutique clothing store. The user may submit a request with the photo in order to obtain recommendations of products similar and/or complimentary to those depicted in the image. In some embodiments, the image repository may comprise images 512 extracted from content available through applications such as a social network application, an email application, a news application, etc. These images may be part of content, such as articles and websites, which are accessible to users. These images may depict products, such as clothing, vehicles, yard equipment, electronics, and/or a wide variety of other types of products. As provided herein, similar and/or complimentary products may be identified and used to supplement the content when accessed by the user.

Image processing functionality 504, such as computer vision functionality, may be used to generate product embeddings 522 of the products depicted by the images. These product embeddings 522 may be generated offline or generated online in response to receiving a request from a computing device for content comprising one or more of the images within the image repository 502. As part of generating the product embeddings, the images in the image repository 502 may be processed by the image processing functionality 504 using the computer vision functionality to identify products 518 depicted by the images using an object detector 514, during operation 402 of method 400. For an image, the object detector 514 of the computer vision functionality may output bounding boxes encompassing products depicted by the image, classifications of the products (e.g., coats and jackets, dresses, eyeglasses, hats, pants, scarves and shawls, shirts and tops, shoes, shorts, skirts, socks, watches, and/or other classifications/categories of clothing products), attributes of the products (e.g., washed, plain, dropped shoulder, symmetrical, regular fit, single breasted, slim fit, organic material, distressed, above hip length fit, material color, material pattern, material type, number and location of buttons, collar type, sleeve length, etc.), and/or confidence values of how confident the computer visions functionality is that a detected product is indeed that product and actually corresponds to the identified classification and attributes.

An embodiment of the object detector 514 of the computer vision functionality processing an image is depicted by FIG. 5B. For example, an image 552 may have been extracted from a travel article. The image 552 may depict a scene with trees, a tower, a person, and a vehicle. The computer vision functionality may generate bounding boxes encompassing the detected products that the object detector 514 detected within the image 552 from the article. For example, the object detector 514 may detect a hat as a product depicted within the image 552. The computer vision functionality may output a bounding 556 encompassing the hat. The object detector 514 may detect a tie as a product depicted within the image 552. The computer vision functionality may output a bounding box 558 encompassing the tie. The object detector 514 may detect a vehicle as a product depicted within the image 552. The computer vision functionality may output a bounding box 560 encompassing the vehicle. The computer vision functionality may output classifications, attributes, and/or confidence values for the hat, tie, and vehicle that were detected by the object detector 514.

The image processing functionality 504 may implement a vector embedding model 516 to generate product vector representations 520 for the detected products within the images from the image repository 502, as illustrated by FIG. 5A. During operation 404 of method 400, the vector embedding model 516 generates a product vector representation for a detected product depicted by an image by projecting attributes of the product into a vector space to create the product vector representation that is stored within a product embedding for the detected product. The product vector representation represents the attributes of the product (e.g., material type, color, shape, size, pattern, etc.) in the vector space. The closer two vector representations are in the vector space, the more similar the products (the more similar the attributes of the products) represented by the vector representations. The product vector representations 520 of the detected products within the images may be stored within the product embeddings 522 for corresponding detected products.

In some embodiments, one or more product embeddings of the product embeddings 522 may be filtered (removed) based upon the one or more product embeddings having confidence values below a threshold confidence. The threshold confidence may be user defined or may be parameter determined based upon a specified precision and recall. Precision may be a function of the threshold confidence. The higher the threshold confidence, the higher the precision that a detected product, attributes of the detected product, and/or a classification of the detected product are correct. Recall relates to how many of the products depicted by an image are actually identified and are not missed. The higher the required precision, the lower the confidence. Accordingly, the threshold confidence may be set in order to achieve a required precision and recall (e.g., an 80% precision that there is an 80% confidence that a detected product is that actual product and a recall of 47% so that 47% of products depicted by an image are detected and not missed).

In some embodiments, new images may be available within the image repository 502 over time. Accordingly, images within the image repository 502 may be periodically evaluated to generate new product embeddings, such as every 4 hours or any other timeframe.

When content, comprising one or more images in the image repository 502, is to be provided to a computing device of a user, product embeddings of detected products depicted by the one or more images may be used to identify similar and/or complimentary products to the detected products, which may be selected from a catalog, which is further described in conjunction with FIG. 6.

During operation 406 of method 400, image processing functionality 606, such as the computer vision functionality, may be used to generate catalog item embeddings 612 for catalog items 604 available in a catalog 602 for supplementing content being accessed by a user, as illustrated by FIG. 6. These catalog item embeddings 612 may be generated offline or generated online in response to receiving a request from a computing device for content (an article) comprising one or more of the images within the image repository 502. The catalog items 604 in the catalog 602 may correspond to imagery, text, videos, a recommendation of a product, and/or any other types of content (e.g., an image of a product, along with descriptive text about the product). The catalog items 604 may have been previously labeled with annotations describing the products, such as bounding boxes around products depicted by the catalog items 604, a category classification of the product, a pixel level segmentation mask that annotates pixels with attributes (e.g., pixels representing buttons on a shirt, pixels representing a logo on the shirt, pixels representing a particular material type of the shirt, pixels representing a collar of the shirt, pixels having a particular color, etc.).

The image processing functionality 606 may process the catalog items 604 using a vector embedding model 608 to project attributes of products depicted by the catalog items 604 into the vector space to create catalog item vector representations that are stored within the catalog item embeddings 612, as part of operation 406 of method 400. For example, the vector embedding model 608 generates a catalog item vector representation for a product depicted by a catalog item by projecting attributes of the product into the vector space to create the catalog item vector representation that is stored within the catalog item embeddings 612. The catalog item vector representation represents the attributes of the product (e.g., material type, color, shape, size, pattern, etc.) in the vector space. The closer two vector representations (e.g., a product vector representation and the catalog item vector representation) are in the vector space, the more similar the products (more similar the attributes of the products) represented by the vector representations. In this way, the catalog item vector representations 610 of the products depicted the catalog items 604 in the catalog 602 may be stored within the catalog item embeddings 612.

In some embodiments, new catalog items may be added to the catalog 602 over time. Accordingly, catalog items in the catalog 602 may be periodically evaluated to generate catalog items embeddings, such as every 4 hours or any other timeframe.

When content comprising one or more images in the image repository 502 is to be provided to a computing device of a user, product embeddings 522 of detected products depicted by the one or more images in the image repository 502 and the catalog item embeddings 612 of the products depicted by the catalog items 604 in the catalog 602 may be used to identify similar and/or complimentary products, which is further described in reference to FIG. 7.

A user of a computing device 712 (e.g., a tablet, a mobile phone, a computer, etc.) may request access to content 714. For example, the user may utilize a web browser, application, or other user interface through the computing device 712 to access the content 714. In some embodiments, the content 714 may comprise an article regarding a celebrity Yori. The article may comprise text describing the celebrity Yori shopping at a new outdoor shopping mall. The article may comprise other content, such as an image 716 of the celebrity Yori wearing a hat, a video of Yori walking around the new outdoor shopping mall, and/or a variety of other content.

In response to the user utilizing the device 712 to access the content 714 of the article describing the celebrity Yori shopping at the new outdoor shopping mall, a determination may be made as to whether the content 714 is eligible for being supplemented with catalog items 604 from the catalog 602. Various criteria and/or criteria combinations may be used to determine whether the content 714 is eligible for being supplemented with catalog items 604 from the catalog 602. For example, the content 714 may be eligible if the content 714 has a particular topic/category (e.g., a news story topic, an entertainment topic, a shopping topic, a videogame topic, etc.) or does not have a particular topic/category of exclusion. The content 714 may be eligible if the content 714 has been published by a content source within a particular timeframe, such as where the content 714 must be published within the past 7 days in order to be eligible. The content 714 may be eligible if the content 714 does not comprise explicit material. In this way, various criteria and/or combinations thereof may be used to determine whether the content 714 is eligible for being supplemented with catalog items 604 from the catalog 602.

If the content 714 is determined to be eligible for being supplemented with catalog items 604 from the catalog 602, then a placeholder for a module 718 may be generated within or associated with the content 714. In some embodiments, the placeholder may be generated as a user interface element, such as through HTML, which will be used as the module 718 within which one or more similar products and/or complimentary products may be populated. In some embodiments, the user interface element may comprise a list user interface element, a carousel interface that allows the user to browse through a set of products displayed as images or cards, a form, a panel, or any other type of interface.

Once the content 714 that the user of the computing device 712 is requesting access is determined to be eligible for being supplemented with catalog items 604 from the catalog 602, a catalog item ranker 702 may implement similarity detection functionality 708 to generate a ranked list of catalog items 710. In particular, the content 714 may comprise one or more images, such as the image 716 of the celebrity Yori wearing the hat and/or other images. These images may be identified by evaluating HTML of the content 714.

In some embodiments where the content 714 was previously processed offline by the image processing functionality, the images may have been stored within the image repository 502 and the image processing functionality 504 such as the computer vision functionality may have used the object detector 514 to identify products within the images in the content 714, such as the hat depicted by the image 716 of the celebrity Yori wearing the hat and/or other detected products depicted by other images of the content 714. Additionally, the image processing functionality 504 such as the computer vision functionality may have used the vector embedding model 516 to project attributes of the products into vector space to create product vector representations stored within product embeddings 704 for the detected products depicted within the images in the content 714.

In some embodiments where the content 714 is processed in real-time in response to a request from the computing device 712 for the content 714, the product embeddings 704 for the detected products depicted within the images in the content 714 may be determined by the image processing functionality 504 and the vector embedding model 516 in real-time in response to receiving the request from the computing device 712 for the content 714.

The product embeddings 704 for the detected products depicted within the images in the content 714 may be input into the catalog item ranker 702 that will execute similarity detection functionality 708 upon the product embeddings 704 for the detected products depicted within the images in the content 714.

The catalog item ranker 702 also takes catalog item embeddings 706 of products depicted by the catalog items 604 in the catalog 602 as input when generating the ranked list of catalog items 710. In some embodiments where the catalog items 604 in the catalog 602 were previously processed offline by the image processing functionality, the image processing functionality 504 such as the computer vision functionality may have used the vector embedding model 516 to project attributes of the products depicted by the catalog items 604 into vector space to create catalog item vector representations stored within catalog item embeddings 706 for the products depicted by the catalog items 604 in the catalog 602. In some embodiments where the catalog items 604 in the catalog 602 are processed in real-time in response to the request from the computing device 712 for the content 714, the catalog item embeddings 706 for the products depicted by the catalog items 604 in the catalog 602 may be generated by the vector embedding model 608 in real-time in response to receiving the request from the computing device 712 for the content 714. The catalog item embeddings 706 for the products depicted by the catalog items 604 in the catalog 602 may be input into the catalog item ranker 702 that will execute similarity detection functionality 708 upon catalog item embeddings 706 and the product embeddings 704 to generate the ranked list of catalog items 710.

In some embodiments, the catalog item embeddings 706 of all products depicted by the catalog items 604 in the catalog 602 may be considered and input into the catalog item ranker 702. In some embodiments, the catalog item embeddings 706 may be filtered to remove catalog item embeddings 706 of products depicted by the catalog items 604 in the catalog 602 that have a different classification/category than the product embeddings 704 for the products depicted within the images in the content 714 (article). For example, if the product embeddings 704 for the products depicted within the images in the content 714 (article) relate to hats and shirts, then catalog item embeddings 706 of products that are not classified as hats or shirts may be excluded/filtered from the catalog item embeddings 706 input into the catalog item ranker 702. In some embodiments, the catalog item embeddings 706 may be filtered so that the catalog items embeddings 706 only include catalog items depicting products with the same classification/category and/or complimentary classifications/categories so that products that are complimentary may be eligible for selecting for inclusion within the module 718. For example, if the product embeddings 704 for the products depicted within the images in the content 714 (article) relate to hats and shirts, then catalog items embeddings 706 relating to products with classifications as hats, shirts, clothing, and accessories may be included within the catalog item embeddings 706 input into the catalog item ranker 702, while others may be filtered/removed such as catalog items embeddings 706 relating to products with classifications of furniture, lawn equipment, sports equipment, vehicles, etc.

Accordingly, during operation 408 of method 400, the catalog item ranker 702 may execute the similarity detection functionality 708 to compute similarity between the product embeddings 704 for the detected products depicted within the images in the content 714 (article) and the catalog item embeddings 706 of the products depicted by the catalog items 604 in the catalog 602 to generate the ranked list of catalog items 710 corresponding to how similar or complimentary are the products depicted by the catalog items 604 to the detected products depicted by the images of the content 714 (article). The closer a product vector representation of a detected product of a product embedding is to a catalog item representation of a product of a catalog item embedding in vector space, the more similar the product of the catalog item embedding is to the detected product of the product embedding. That is, the location of a vector representation of a product within the vector space is determined by values of the attributes of the product that are projected into the vector space. If two vector representations have similar values of attributes (e.g., similar color, pattern, shape, size, material type, style, button location and count, sleeve length, etc.), the closer the vector representations will be in the vector space, and thus the more similar the products represented by the vector representations. In some embodiments, a cosine similarity between a product vector representation of a detected product (e.g., the hat being worn by Yori in the image 716) and a catalog item representation of a catalog item is calculated to determine a similarity between the detected product (e.g., the hat being worn by Yori in the image 716) and a product depicted by the catalog item (e.g., a hat depicted by a catalog item in the catalog 602).

During operation 410 of method 400, one or more products may be selected from the ranked list of catalog items 710 based upon ranks assigned to the products. In some embodiments, a selection parameter may specify a number of products to select, such as 6 highest ranked products (e.g., 6 most similar products to the detected products within the images in the content 714). In some embodiments, a similarity parameter may specify a level of similarity to the detected products depicted by the images of the content 714 (article), such that products are selected from the ranked list of catalog items 710 based upon the products having at least the level of similarity specified by the similarity parameter (e.g., 75% similar or more). In some embodiments, a complimentary parameter may be used for selecting products from the ranked list of catalog items 710. The complimentary parameter may indicate that products that are similar to the detected products depicted by the images of the catalog item (article) but have a different classification/category are to be selected from the ranked list of catalog items 710. For example, a coat of catalog item 724 may have a similar color and pattern, but has a coat classification as opposed to a hat classification of the hat depicted by the image 716, and thus the coat of catalog item 724 may be selected from the ranked list of catalog items 710 because the coat of catalog item 724 may compliment the hat of image 716.

In some embodiments, the coat of catalog item 724 may be selected as a complimentary product, a first hat of catalog item 720 with a similar color, pattern, and shape as the hat depicted in the image 716, a second hat of catalog item 722 with a similar pattern and shape as the hat depicted in the image 716, and/or other products may be selected from the ranked list of catalog items 710 based upon their ranks and/or parameters. Catalog items depicting the first hat (catalog item 720), the second hat (catalog item 722), the complimentary coat (catalog item 724), and/or the other selected products may be populated within the module 718. In some embodiments, the module 718 may be populated/embedded within the content 714 or may be displayed separate from the content 714 such as through a different user interface or user interface element. In some embodiments, the products may be displayed through a carousel interface populated within the module 718 or any other type of interface. In some embodiments, the module 718 may be populated with redirection links to websites associated with the products populated within the module 718, such as a redirection link 725 to a retail website for the coat of catalog item 724. In some embodiments, the module 718 may be populated with purchasing functionality 726 that may be used by the user to purchase products populated within the module 718. In this way, the content 714 and the module 718 populated with catalog items depicting the selected products from the ranked list of catalog items 710 may be displayed through a user interface of the computing device 712, during operation 412 of method 400.

Figure 8:
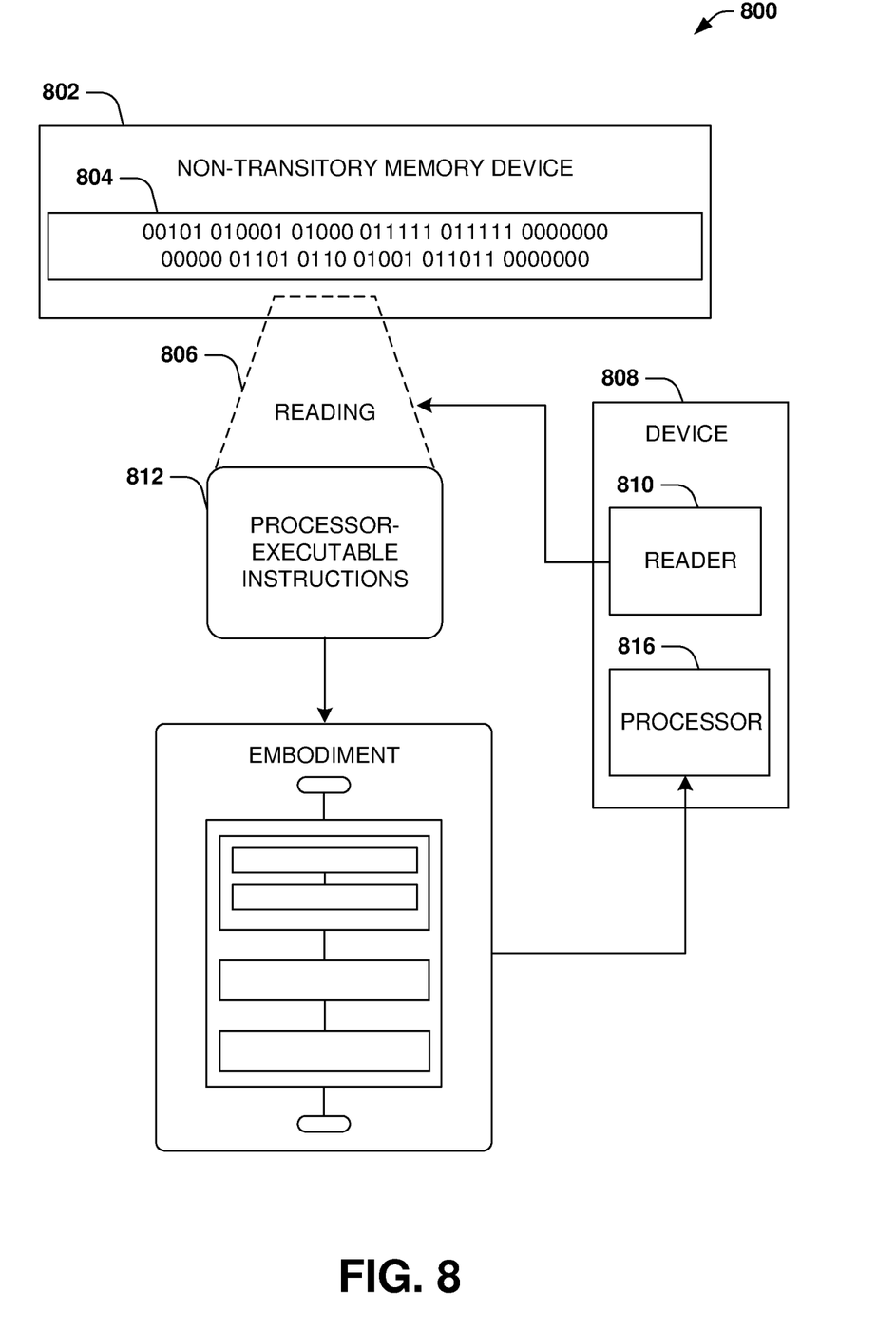
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4, for example. In some embodiments, the processor-executable instructions 812 are configured to cause implementation of a system, such as at least some of the example system 500 of FIG. 5A, at least some of the example system 550 of FIG. 5, at least some of the example system 600 of FIG. 6, and/or at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In some embodiments, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
      processing images using computer vision functionality to identify products depicted by the images using an object detector, wherein the computer vision functionality outputs bounding boxes encompassing the products depicted by the image, classifications of the products, and attributes of the products;
generating product embeddings for the products based upon the output from the computer vision functionality, wherein attributes of the products are projected into vector space to create product vector representations stored within the product embeddings for the products;
labelling catalog items within a catalog with annotations comprising a pixel level segmentation mask that annotates pixels with attributes;
generating catalog item embeddings for the catalog items within the catalog;
projecting attributes of products depicted by the catalog items, including attributes with which pixels were annotated by the pixel level segmentation mask, into the vector space to create catalog item vector representations stored within the catalog item embeddings for the catalog items;
computing similarity between the catalog item vector representations, created by projecting the attributes with which pixels were annotated by the pixel level segmentation mask, and a product vector representation of a detected product having a first classification and depicted by an image in order to rank the products depicted by the catalog items to generate a ranked list of catalog items based upon similarity to the detected product depicted by the image;
selecting two or more products having the same first classification as the detected product, from the ranked list of catalog items generated based upon similarity to the detected product depicted by the image, based upon a determination that content including the image depicting the detected product is to be displayed through a user interface on a device; and
concurrently displaying, through the user interface on the device, the content including the image depicting the detected product having the first classification and a module populated with catalog items depicting the two or more products having the same first classification as the detected product and selected from the ranked list of catalog items generated based upon similarity to the detected product depicted by the image, wherein the displaying comprises displaying, within the module, a first product of the two or more products having the same first classification as the detected product adjacent to a second product of the two or more products having the same first classification as the detected product.

2. The method of claim 1, wherein computing the similarity comprises:
determining a cosine similarity between the product vector representation of the detected product and a catalog item representation of a catalog item to determine similarity between the detected product and a product depicted by the catalog item.

3. The method of claim 1, wherein the selecting two or more products comprises:
utilizing a similarity parameter, specifying a level of similarity to the detected product depicted by the image, to select the two or more products based upon the two or more products being within the level of similarity specified by the similarity parameter.

4. The method of claim 1, wherein the selecting two or more products comprises:
selecting a complimentary product based upon the complimentary product having a different classification than the first classification of the detected product depicted by the image, wherein the displaying comprises displaying, within the module, the complimentary product having the different classification concurrently with the first product having the same first classification and the second product having the same first classification.

5. The method of claim 1, comprising:
identifying the first classification of the detected product depicted by the image; and
selecting the catalog items within the catalog based upon the catalog items having the first classification.

6. The method of claim 1, comprising:
identifying the first classification of the detected product depicted by the image; and
selecting a catalog item within the catalog based upon the catalog items having a different classification as the first classification.

7. The method of claim 1, comprising:
populating the module with purchasing functionality to purchase the two or more products depicted by the catalog items.

8. The method of claim 1, comprising:
populating the module with redirection links to websites associated with the two or more products depicted by the catalog items.

9. The method of claim 1, comprising:
training a computer vision model of neural network layers, of the computer vision functionality, to at least one of identify products, utilize a vector embedding model to project attributes of detected products into vector space, execute similarity detection functionality to determine similarity between the vector representations or rank products based upon similarity.

10. The method of claim 1, wherein the generating the catalog item embeddings and the computing similarity are performed online in response to a determination that the content comprising the image depicting the detected product is to be displayed through the user interface.

11. The method of claim 1, wherein the computer vision functionality outputs confidence values for the products, and wherein the method comprises:
identifying a plurality of detected products depicted by images within the content utilizing the computer vision functionality;
generating a plurality of product embeddings for the plurality of detected products;
computing similarity between the catalog item vector representations and the plurality of product embeddings to generate ranked lists of products; and
populating the module with products selected from the ranked lists of products.

12. The method of claim 11, comprising:
filtering the plurality of product embeddings to remove product embeddings having confidence values, output by the computer vision functionality, below a threshold confidence.

13. The method of claim 1, comprising:
extracting the images from articles eligible for display through a website or application.

14. A non-transitory machine readable medium having stored thereon processor-executable instructions that when executed cause performance of operations, the operations comprising:

processing images using computer vision functionality to identify products depicted by the images using an object detector, wherein the computer vision functionality outputs bounding boxes encompassing the products depicted by the image, classifications of the products, and attributes of the products;

generating product embeddings for the products based upon the output from the computer vision functionality, wherein attributes of the products are projected into vector space to create product vector representations stored within the product embeddings for the products;

labelling catalog items within a catalog with annotations comprising a pixel level segmentation mask that annotates pixels with attributes;

generating catalog item embeddings for the catalog items within the catalog;

projecting attributes of products depicted by the catalog items, including attributes with which pixels were annotated by the pixel level segmentation mask, into the vector space to create catalog item vector representations stored within the catalog item embeddings for the catalog items;

computing similarity between the catalog item vector representations, created by projecting the attributes with which pixels were annotated by the pixel level segmentation mask, and a product vector representation of a detected product having a first classification and depicted by an image in order to rank the products depicted by the catalog items to generate a ranked list of catalog items based upon similarity to the detected product depicted by the image; and displaying, through a user interface on a device, two or more products having the same first classification as the detected product from the ranked list of catalog items based upon a determination that content including the image depicting the detected product having the first classification is to be displayed, wherein the displaying comprises displaying a first product of the two or more products having the same first classification as the detected product adjacent to a second product of the two or more products having the same first classification as the detected product.

15. The non-transitory machine readable medium of claim 14, wherein the operations comprise:
displaying the two or more products through a carousel interface within a module populated within the user interface.

16. The non-transitory machine readable medium of claim 14, wherein the operations comprise:
in response to determining that the content is eligible for being supplemented by similar products, generating a placeholder for a module within which the two or more products are to be populated.

17. The non-transitory machine readable medium of claim 14, wherein the operations comprise:
periodically evaluating the catalog to generate catalog item embeddings and generating ranked lists of products based upon similarity computations.

18. The non-transitory machine readable medium of claim 14, wherein the operations comprise:

periodically generating product embeddings and generating ranked lists of products based upon similarity computations.

19. A computing device comprising:

a processor; and memory comprising processor-executable instructions that when executed by the processor cause performance of operations, the operations comprising:

processing images using computer vision functionality to identify products depicted by the images using an object detector, wherein the computer vision functionality outputs attributes of the products;

generating product embeddings for the products based upon the output from the computer vision functionality, wherein attributes of the products are projected into vector space to create product vector representations stored within the product embeddings for the products;

labelling catalog items within a catalog with annotations comprising a pixel level segmentation mask that annotates pixels with attributes;

generating catalog item embeddings for the catalog items within the catalog;

projecting attributes of products depicted by the catalog items, including attributes with which pixels were annotated by the pixel level segmentation mask, into the vector space to create catalog item vector representations stored within the catalog item embeddings for the catalog items;

computing similarity between the catalog item vector representations, created by projecting the attributes with which pixels were annotated by the pixel level segmentation mask, and a product vector representation of a detected product having a first classification and depicted by an image in order to rank the products depicted by the catalog items to generate a ranked list of catalog items based upon similarity to the detected product depicted by the image; and displaying, through a user interface on a device, two or more products having the same first classification as the detected product from the ranked list of catalog items based upon a determination that content including the image depicting the detected product having the first classification is to be displayed, wherein the displaying comprises displaying a first product of the two or more products having the same first classification as the detected product adjacent to a second product of the two or more products having the same first classification as the detected product.

20. The computing device of claim 19, wherein the operations comprise:
displaying the two or more products through a carousel interface within a module populated within the user interface.

* * * * *